United States Patent
Stoakes et al.

(10) Patent No.: US 11,586,501 B2
(45) Date of Patent: Feb. 21, 2023

(54) DYNAMIC MEMORY MANAGEMENT SYSTEM

(71) Applicant: Innovations In Memory LLC, Dover, DE (US)

(72) Inventors: Timothy Stoakes, One Tree Hill (AU); Mark Lewis, San Jose, CA (US)

(73) Assignee: Innovations In Memory LLC, Dover, DE (US)

( * ) Notice: Subject to any disclaimer, the term of this patent is extended or adjusted under 35 U.S.C. 154(b) by 0 days.

(21) Appl. No.: 17/321,096

(22) Filed: May 14, 2021

(65) Prior Publication Data

US 2021/0271546 A1    Sep. 2, 2021

Related U.S. Application Data

(63) Continuation of application No. 16/421,765, filed on May 24, 2019, now Pat. No. 11,010,247.

(51) Int. Cl.
*G06F 3/06* (2006.01)
*G06F 11/10* (2006.01)

(52) U.S. Cl.
CPC .......... *G06F 11/108* (2013.01); *G06F 3/0604* (2013.01); *G06F 3/0644* (2013.01); *G06F 3/0658* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 7,856,528 B1 | 12/2010 | Frost et al. | |
| 2006/0059306 A1* | 3/2006 | Tseng | G06F 11/1096 711/170 |
| 2020/0081831 A1 | 3/2020 | Tomic et al. | |

FOREIGN PATENT DOCUMENTS

| | | | | |
|---|---|---|---|---|
| CN | 105471930 A | * | 4/2016 | |
| CN | 108073357 A | * | 5/2018 | .............. G06F 11/10 |
| WO | WO-2004104845 A1 | * | 12/2004 | .............. G06F 12/12 |

* cited by examiner

*Primary Examiner* — Brian R Peugh
(74) *Attorney, Agent, or Firm* — Volpe Koenig

(57) ABSTRACT

A memory system uses a dynamic RAID scheme to dynamically encode RAID address space geometries. The dynamic RAID scheme solves issues with the algorithmic layout approach and flat virtual address space used in conventional RAID systems. The dynamic RAID scheme can be used for any RAID algorithm and does not require static mapping. In other words, there is no requirement that each strip be located in the same relative location in memory devices and there is no requirement that stripes use the same combination of memory devices.

20 Claims, 6 Drawing Sheets

| PDEV0 | PDEV1 | PDEV2 | PDEV3 | PDEV4 | PDEV5 | PDEV6 | PDEV7 | PDEV8 | PDEV9 | PDEV10 | PDEV11 |
|---|---|---|---|---|---|---|---|---|---|---|---|
| 499997 | 499997 | 499997 | 499997 | 499997 | 499997 | 499998 | 499998 | 499998 | 499998 | 499998 | 499998 |

| PDEV0 | PDEV1 | PDEV2 | PDEV3 | PDEV4 | PDEV5 | ... | PDEV8 | PDEV9 | PDEV10 | PDEV11 | PDEV12 |
|---|---|---|---|---|---|---|---|---|---|---|---|
| 499997 | 499997 | 499997 | 499997 | 499997 | 499997 | | 499998 | 499998 | 499998 | 499998 | 1000000 |

DYNAMIC MEMORY MANAGEMENT SYSTEM

The present application is a continuation of U.S. application Ser. No. 16/421,765, filed on May 24, 2019, now U.S. Pat. No. 11,010,247, the contents of which is hereby incorporated by reference in its entirety.

TECHNICAL FIELD

The present application relates to computer memory systems.

BACKGROUND

Computer memory systems may be either of the persistent or non-persistent type. Examples of persistent memory types are magnetic cores, disk drives, tape drives and semiconductor flash memories. Non-persistent memory types may be semiconductor memories such as DRAM or the like. Non-persistent memory typically has rapid access times for both reading and writing of data and is used as computer main memory or cache memory.

Computer database systems, data centers, distributed data systems, the Internet, etc., and the storage devices associated therewith may store vast amounts of data. Fast response times are needed from servers in data centers when servicing user requests. Bottlenecks in data centers are often due to excessive data access latency of the persistent storage media. While having significantly lower latency than a disk device, flash memory remains limited in access time by the design and method of operation of currently available memory modules.

Redundant Arrays of Independent (or Inexpensive) Disks (RAID) protects against the loss of data by adding redundancy. In a properly configured RAID architecture, the loss of any single disk will not interfere with the ability to access or reconstruct the stored data.

Instead of keeping a full duplicate copy of the data as in RAID-1, data may be spread over several disks with an additional disk added. The data on the additional disk may be calculated (using Boolean XORs) based on the data on the other disks. In RAID-5, if any single disk in the set of disks is lost, the data stored on that disk can be recovered through calculations performed on the data on the remaining disks. RAID-6 is similar to RAID-5 but uses dual parity. These implementations are less expensive than RAID-1 because they do not require the 100% disk space overhead that RAID-1 requires. However, because the data on the disks is calculated, there are performance implications associated with writing, and with recovering data after a disk is lost.

Fundamental to RAID is striping, a method of concatenating multiple drives (memory units) into one logical storage unit. Striping involves partitioning storage space of each drive into stripes which may be one sector or smaller, or as large as several megabytes. These stripes are then interleaved so that the combined storage space is comprised of stripes from each drive in the stripe.

A traditional RAID mapping uses an algorithmic approach to map data stripes to a set of fault domains (memory modules, drives), and default locations within the memory modules. For example, a first stripe might be stored at offset 0 in a same set of memory modules, a second stripe might be storage at offset 4 KB in the same set of memory modules, etc.

A strip refers to the amount of data written by RAID to a single physical device in a same stripe. Whether a particular strip within the stripe contains data or parity is usually also algorithmically determined by simply rotating through memory modules. Stripes are collected together into a virtual address space to support the algorithmic mapping. For example, 10×1 TB drives in RAID6 8+2 might expose a flat virtual address space of 0-8 TB with granularity of 4 KB.

Being algorithmic, this mapping is difficult to change for a given established RAID array. This makes implementing certain features either prohibitively difficult or expensive at runtime, such as dynamically expanding or shrinking (adding/removing) memory modules, supporting memory modules of differing capacities, etc.

BRIEF DESCRIPTION OF THE DRAWINGS

FIGS. 4A and 4B show examples of how the dynamic RAID scheme incorporates new memory devices into the memory system.

DETAILED DESCRIPTION

A memory system uses a dynamic RAID scheme to dynamically encode RAID address space geometries. The dynamic RAID scheme solves issues with the algorithmic layout approach and flat virtual address space used in conventional RAID systems. The dynamic RAID scheme can be used with any RAID algorithm and does not require static mapping. In other words, there is no requirement that each strip be located in the same relative location in memory devices and there is no requirement that each stripe use the same combination of memory devices.

Figure 1:
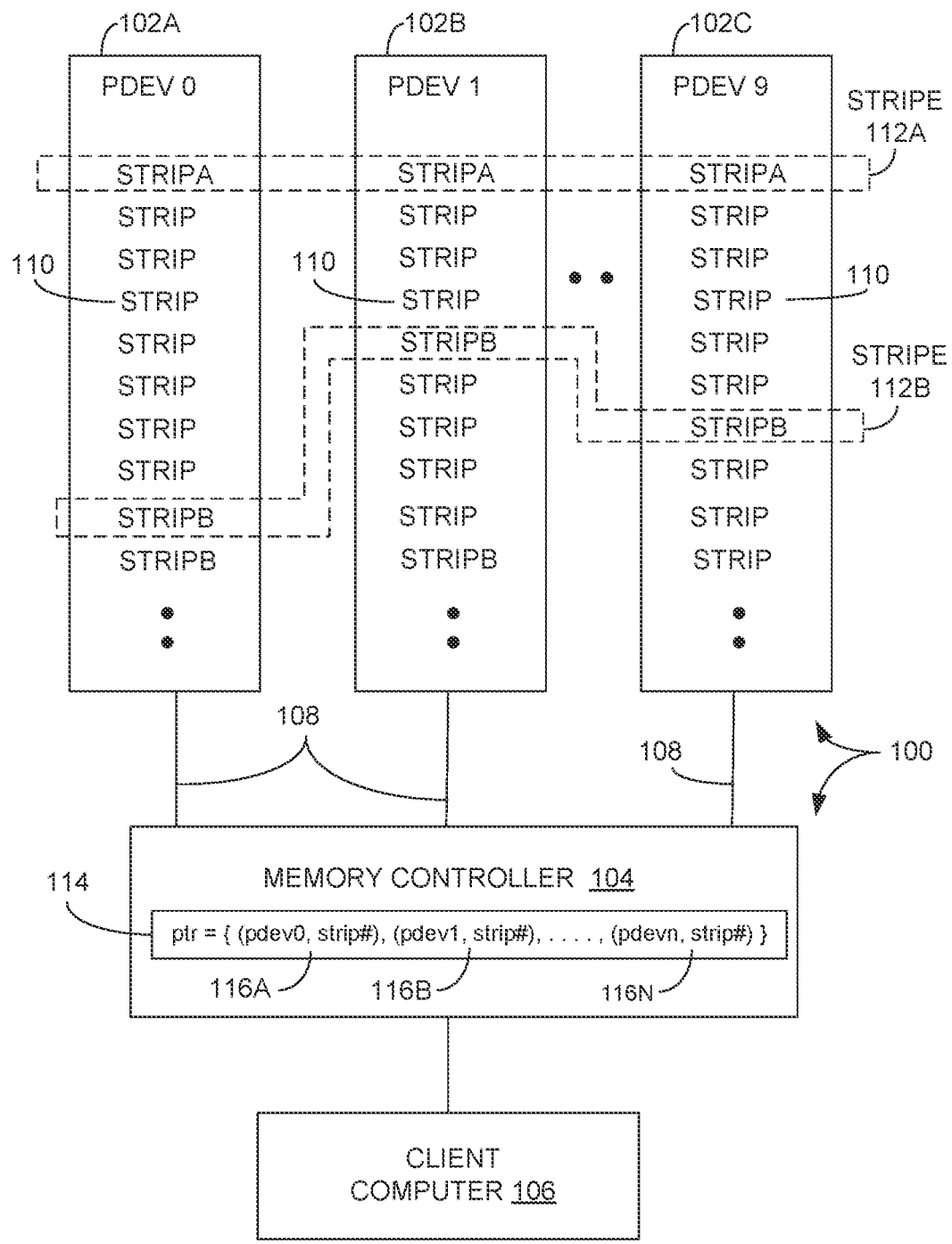
FIG. 1 shows an example memory system that uses a dynamic RAID scheme.

FIG. 1 illustrates a memory system 100 comprising a plurality of memory modules 102A-102N connected to a memory controller 104 through a bus 106. In one example, each memory module 102 may comprise a physical device (pdev) such as a solid state disk (SSD). In the description below, a physical device (pdev) refers to any storage device that may fail independently of other pdevs. For example, a single SSD may fail independently of other SSDs that may operate within the same memory system 100.

As mentioned above, RAID refers to an algorithm used to join together multiple memory modules to improve redundancy, performance and/or capacity. For example, RAID6 might combine 8 pdevs with 2 parity pdevs, creating a memory system 100 with the capacity of 8 pdevs, where any 2 pdevs can be lost without losing data. A fault domain refers to an individual physical device that may fail independently of the other physical devices in the RAID system.

A strip 110 refers to the amount of data written by RAID to a single pdev 102 in a same stripe 112. For example, strips 110 may be 4 KiloBytes (KBs) and contain user-data or parity information. Of course, this is just an example, and strips 110 may be any size. Stripes 112 refer to a collection of strips 110 that are joined together by RAID. For example, stripes 112A and 112B may contain 4 KB*8 strips=32 KB of data and 4 KB*2 strips=8 KB of parity. When data in one of strips 110 has a detected error, RAID may use data in the other strips 110 within a same stripe 112 to reconstruct the erroneous data.

Using 8+2 RAID6 as an example (throughout), memory controller 104 needs to find (8+2) memory locations to store the 10 strips 110 for each slice 120. Each memory location needs to provide an independent fault domain, and memory controller 104 needs to remember the mapping in a way that can be looked-up quickly.

Memory controller 104 uses a dynamic RAID scheme to dynamically encode RAID address space geometries. The dynamic RAID scheme solves issues with the algorithmic layout approach and flat virtual address space used in conventional RAID systems. The dynamic RAID scheme can be used for any RAID algorithm (e.g. RAID6, RAID1, etc.) or geometry (10+2, 1+1+1, etc.).

The dynamic RAID scheme does not require static mapping. In other words, there is no requirement that each strip 110 be located in the same relative location in pdevs 102. For example, stripe 112A may include strips A and stripe 112B may include strips B. Memory controller 104 may store strips A for stripe 112A at a same zero offset location of pdevs 102A-102C. However, memory controller 104 may store strips B for stripe 112B at different offsets locations in pdevs 102A-102C. There is also no requirement that each stripe 112 use the same combination of pdevs 102.

A segment pointer 114 is used by the dynamic RAID scheme to address data. In this example, segment pointer 114 contains 10 entries 116 for an 8+2 RAID6 layout.

Figure 2:
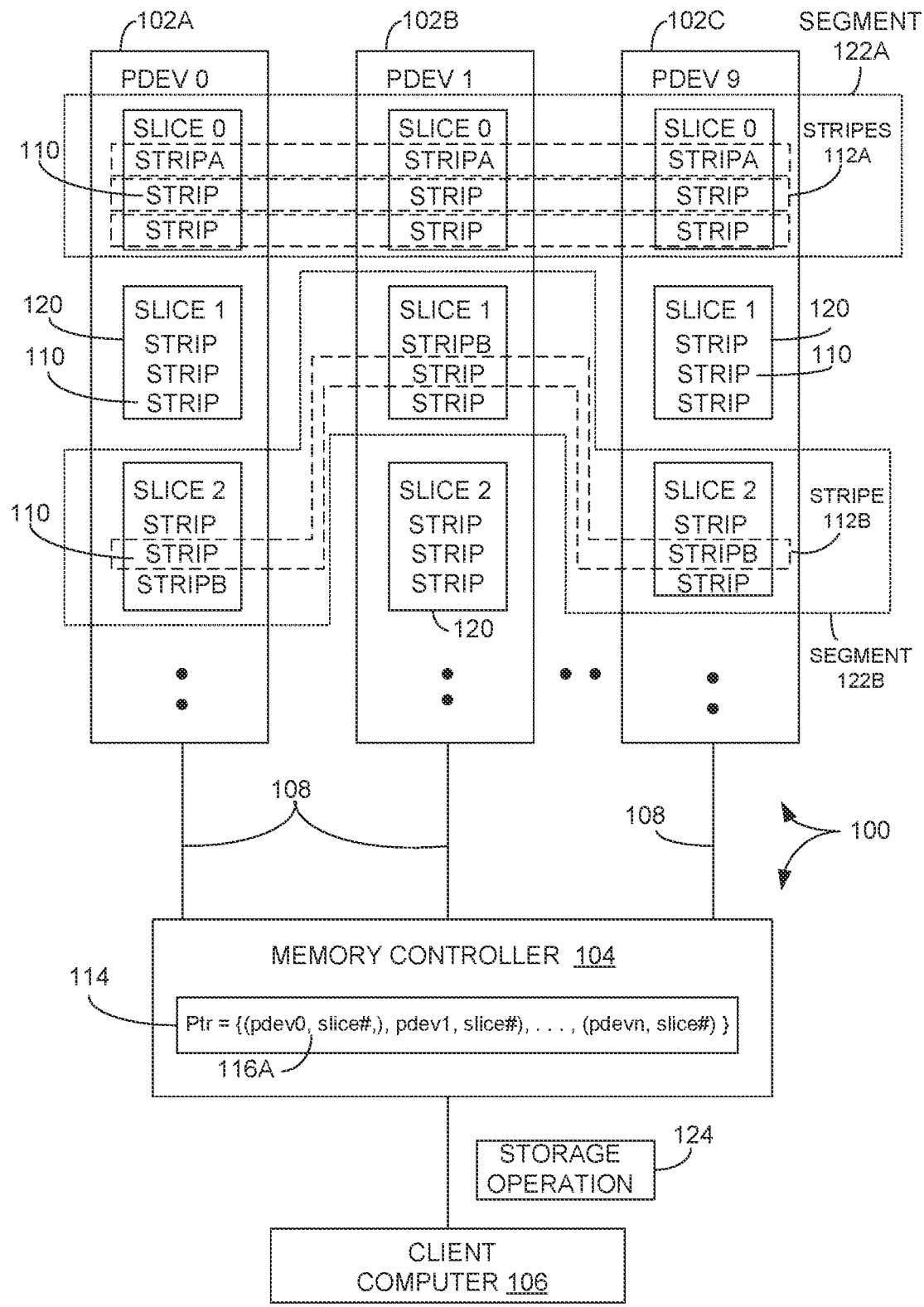
FIG. 2 shows one example of how the memory system of FIG. 1 uses segments to implement the dynamic RAID scheme.

FIG. 2 shows another version of the dynamic RAID scheme where multiple contiguous strips 110 on each pdev 102 are combined into larger slices 120. Segment pointer 114 may point to base starting addresses of slices 120 on different pdevs 102. A simple algorithmic approach is then used to map stripes 112 within each slice 120. Segment pointer 114 now becomes:
segment pointer={(pdev0, slice #), (pdev1, slice #), . . . , (pdevn, slice #)}

Memory controller 104 may define slices 120 as fixed size elements, such as 128 contiguous strips 110. This reduces the overhead of segment pointer 114 to the same, if not better than, traditional RAID pointers.

Memory controller 104 may randomly assign slices 120 from independent pdevs 102 to segments 122. Each segment 122 includes a set of contiguous stripes 112. For example, segment 122A includes contiguous stripes 112A. Strips 110 in each slice 120 have a same relative offset in pdevs 102A-102C. Segment 122B includes multiple contiguous stripes 112B. However, strips 110 in each slice 120 have a different relative offsets in pdevs 102A-102C.

Memory controller 104 may use stripes 112 in higher-level applications for data storage. Memory controller 104 may use segment pointer 114 (and a simple offset inside it if required) to reference slices 120. Slice allocation may have different policy choices, such as wear levelling, pdevs with differing capacities, etc.

Figure 3:
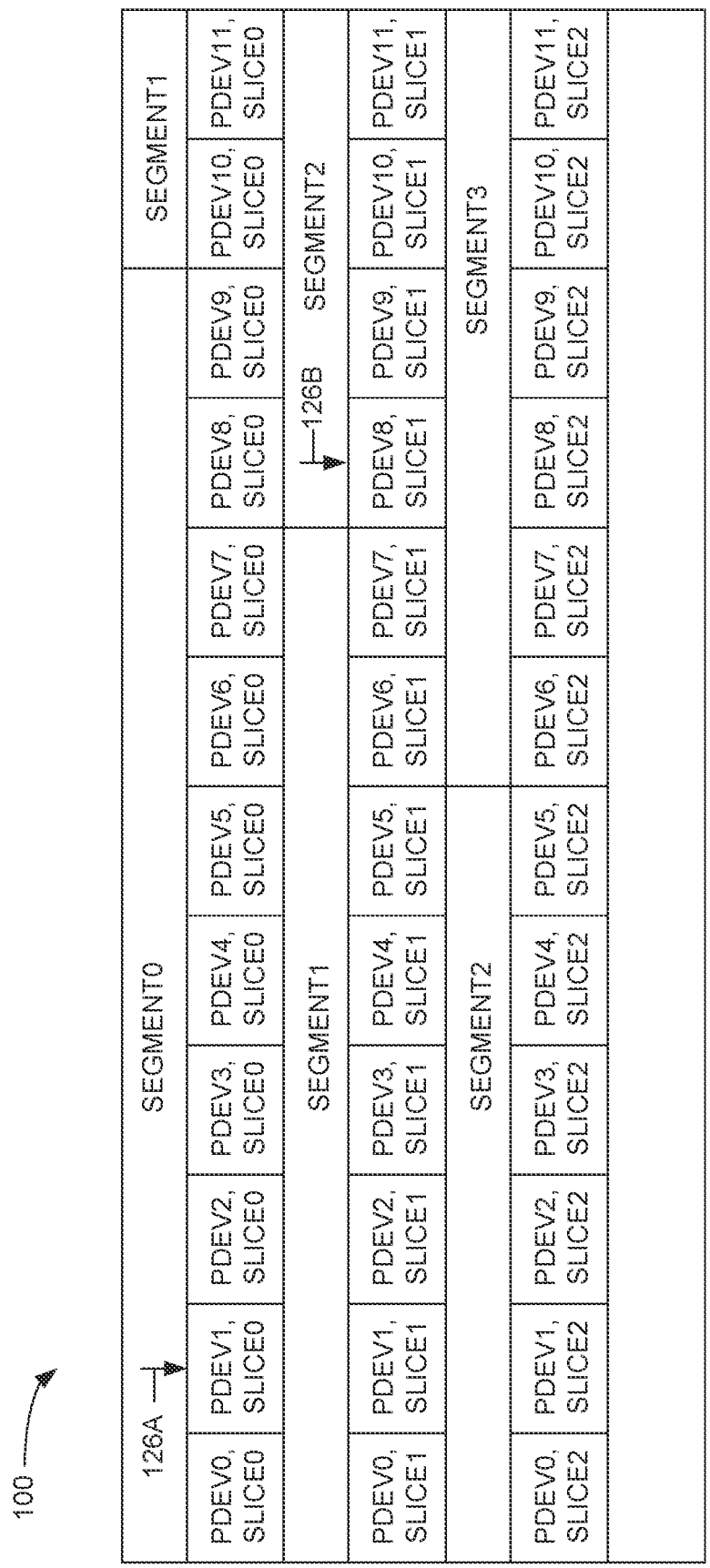
FIG. 3 shows segment pointers used in the dynamic RAID scheme to address data.

FIG. 3 shows example segments in more detail. In this example, memory system 100 operates an 8+2 RAID6, but otherwise does not discuss it. The strip size is 4 KB, there are 12 pdevs with 1 TB capacity each, and the size of each slice is 2 MB. Slices 120 are assigned from pdevs 102 according to any algorithm. For example, memory controller 104 may choose slices 120 from pdevs 102 sequentially. However, memory controller 104 may create segments 122 from any combination and sequence of pdevs and slices.

Three example segments are shown in FIG. 3. Memory controller 104 creates the following pointer for segment0 for storing data associated with storage requests.

Segment0 pointer={(pdev0, slice0), (pdev1, slice0), (pdev2, slice0), (pdev3, slice0), (pdev4, slice0), (pdev5, slice0), (pdev6, slice0), (pdev7, slice0), (pdev8, slice0), (pdev9, slice0)}

In this example, memory controller 104 starts from the first available slice in the first available pdev. Assuming no data is currently stored in pdevs 102, memory controller 104 may create a first segment0 starting with (pdev0, slice0). Assuming pdevs are selected in sequential order, memory controller 104 selects a next slice0 from the next sequential pdev1. Controller 104 continues selecting the first slice0 from additional pdevs 2-9 creating segment0 from 10 pdevs. This provides space for the 8+2 RAID6 with slices in two pdevs 102 used for storing parity data for the data stored in the other 8 pdevs 102.

Memory controller 104 may generate a second pointer for segment1. In this example there are 12 pdevs in memory system 100. Accordingly, memory controller 104 creates segment1 starting from the next available slice0 in the next two sequential pdevs 10 and 11. Memory controller 104 then uses slice1 from pdevs 0-7 to form the remaining 8 portions of segment1.

Segment1 pointer={(pdev10, slice0), (pdev11, slice0), (pdev0, slice1), (pdev1, slice1), (pdev2, slice1), (pdev3, slice1), (pdev4, slice1), (pdev5, slice1), (pdev6, slice1), (pdev7, slice1)}

Memory controller 104 may generate a next pointer for segment2 starting from a next unused slice1 in the next sequential pdev8 and adds additional slice1 from pdevs 9-11. Memory controller 104 uses the next available slice2 in pdevs 0-5 to complete segment2.

Segment2 pointer={(pdev8, slice1), (pdev9, slice1), (pdev10, slice1), (pdev11, slice1), (pdev0, slice2), (pdev1, slice2), (pdev2, slice2), (pdev3, slice2), (pdev4, slice2), (pdev5, slice2)}

Segment Addressing

In a first addressing example, memory controller 104 performs storage operations using segments 1-3. For example, memory controller 104 may receive a storage operation 124 (see FIG. 2) from client computer 106 that includes a logical address. A flash translation layer (FTL) in memory controller 104 may map the logical address received from client computer 106 to a physical memory location in pdevs 102 that have been configured into segments 1-3. In this example, the FTL maps the logical address to segment0 with a 5 KB offset.

Memory controller 104 may start from the beginning of the segment0 pointer and advance in multiples of 4 KB, which in this example, is the size of strips 110. Memory controller 104 moves an index 126A one element (pdev, strip) for each 4 KB offset. The first 4 KB offset moves index 126A to the second element in segment0 (pdev1, slice0). Memory controller 104 then moves index 126A the remaining offset of 5 KB-4 KB=1 KB into the first 4 KB strip 110 of segment element (pdev1, slice0). In another example, the FTL may map a logical address to segment0 with offset 39 KB. As explained above, the stripe size for RAID6 is 8*4 KB=32 KB. Dividing the stripe size into the address offset generates a quotient 39 KB/32 KB=1 with a remainder of 7

KB. Memory controller 104 divides the remainder into the strip size generating the quotient 7 KB/4 KB=1 and the remainder=3.

The first 32 KB offset moves index 126A to the second stripe in segment0 that includes the second set of 4 KB strips 110. The remaining 7 KB offset moves index 126A to the 2nd element (pdev1, slice0) in segment0. The remaining 3 KB of offset moves the index 1 KB into the second strip in element (pdev1, slice0) of segment0. Based on the memory operation, memory controller 104 either reads or writes a block of data at the 1 KB of pdev1, slice0.

In a next example, memory controller 104 receives a storage operation mapped to segment2 with an address offset of 10 MB. Memory controller 104 divides the address offset by the stripe size generating a quotient value of 10 MB/32 KB=320 with a remainder of 0. Since there is no remainder, memory controller 104 moves index 126B to the 0th element of the segment2 (pdev8, slice1). Based on the type of memory operation, memory controller 104 then reads or writes a block of data at the beginning of the 320th strip 110 in pdev8, slice1.

In another example, memory controller 104 receives a storage operation identifying segment2 with an offset of 17 MB. Memory controller 104 determines the address offset is invalid, since a slice size of 2 MB means segments 122 only have a data size of 2 MB*8=16 MB. Thus, an address offset of 17 MB is outside of the allowed segment size.

Memory Expansion

Adding a new pdev 102 to memory system 102 adds more slices 120 to the memory pool for allocation. The new pdev 102 defines a same single fault domain and therefore cannot by itself store a new stripe 112. In other words, only one new RAID component can be used in each pdev 102. In one example, memory controller 104 may rewrite an entire segment to include the new pdev 102. However, this is expensive in terms of performance, both in overall rewrite time, impact on other concurrent operations, and media wear.

Instead of rewriting an entire stripe 112 to a new pdev geometry, memory controller 104 may only move one strip 110 or slice 120 of a stripe from an old pdev to the new pdev. The reduced rewrite evens out 'bumps' in space usage when adding a new pdev.

Selecting the same old and new pdevs for all strips 110 in a slice 120 may significantly reduce the amount of metadata overhead. Memory controller 104 can update a single segment pointer 114 for a large number of strips 110. A similar metadata update may be used for failure-rebuilds.

One example operation used by memory controller 104 for incorporating new pdevs 102 may first select the existing pdev 102 with the most active strips 110. Memory controller 104 then moves a slice 120 of strips 110 from the selected pdev 102 to a pdev 102 with the least number of active strips 110. Which may initially be the newly added pdev. Pdevs 102 may have different physical capacities or may have different operational capacities due to different numbers of bad memory blocks. Accordingly, memory controller 104 may scale the number of active strips 110 based on the associated capacity of pdev 102.

FIG. 4A shows one example slice usage table 140 that identifies the number of free slices currently existing in different pdevs 0-11. This example assumes each pdev has a capacity of 1 TB, and a slice size of 2 MB. Each pdev then contains 1 TB/2 MB=500000 slices. Memory controller 104 has currently allocated some slices, leaving the free slice counts shown in slice usage table 140.

FIG. 4B shows slice usage table 140 after a new pdev12 with a capacity of 2 TB is added to memory system 100. Initially there are no changes to existing segments, leaving memory system 100 with the unbalanced slice usage table 140 in FIG. 4B.

Figure 5:
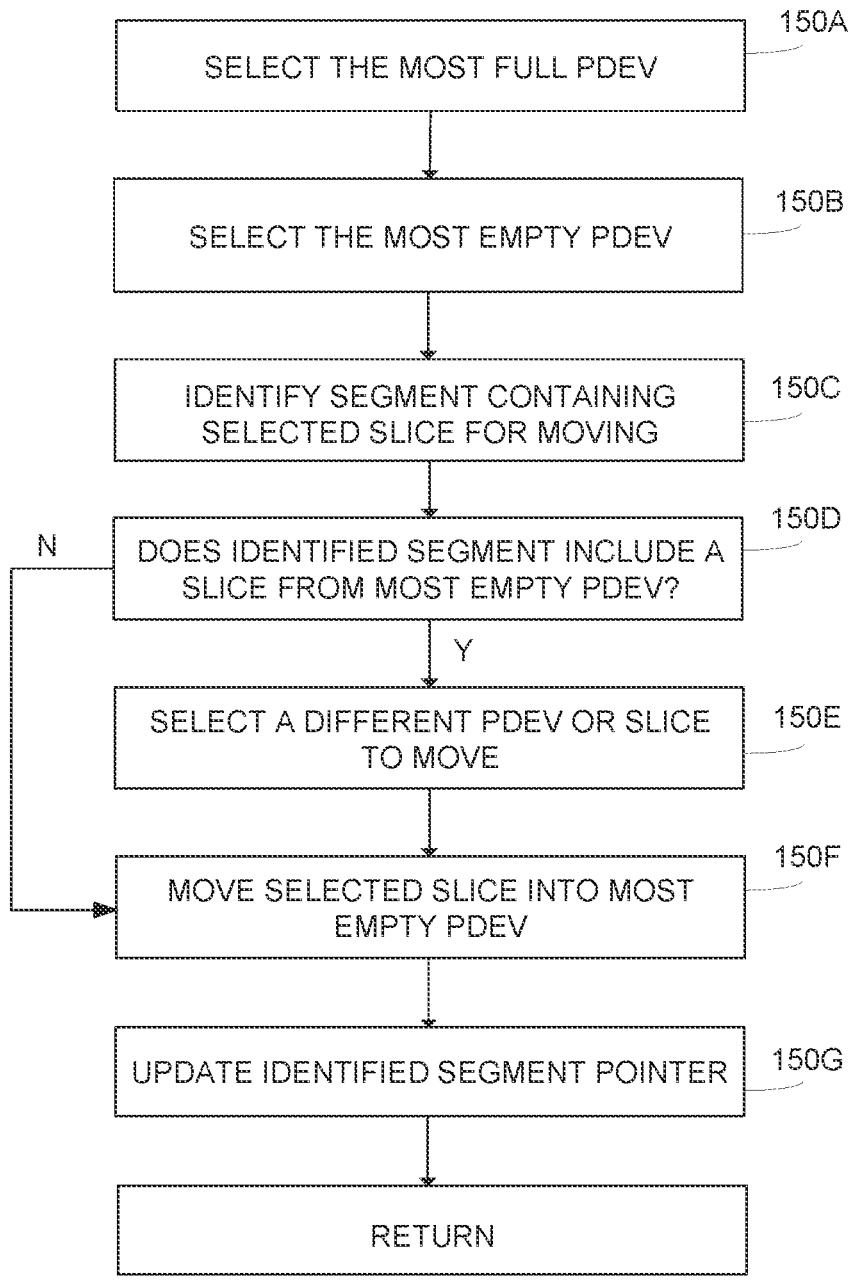
FIG. 5 shows in more detail how the dynamic RAID scheme dynamically incorporates new memory devices into the memory system.

Memory controller 104 may apply a minimal-move algorithm to balance out slice usage. Other algorithms can be used and may be based on device load such as how busy the device is, different device performance envelopes such as slow drives vs. fast drives, etc. Referring to FIGS. 4B and 5, memory controller in operation 150A may first identify the most-full pdev 102. In the example, shown in FIG. 4B, the most-full pdev is any one of pdev0-pdev5. Without loss of generality, memory controller 104 may choose a currently used slice 120 on pdev0 to move.

In operation 150B, memory controller 104 selects the most-empty pdev12. In this example, memory controller 104 selects an empty slice0 on pdev12 to move data to.

In operation 150C, memory controller 104 searches all segment pointers to discover which segment 122 contains the selected slice for moving to pdev12 (pdev0, slice0). In this example, segment0 contains pdev0, slice0. Of course, this is just an example and other indexing techniques also may be used for identifying the selected slice.

In operation 150D, memory controller 104 determines if the identified segment0 already uses a slice in pdev12. If so, memory controller 104 selects a different pdev and/or a different slice for moving to the most-empty pdev12.

In operation 150F, memory controller 104 moves the selected slice (pdev0, slice0) to the most-empty pdev (pdev12, slice0). If required, memory controller 104 may prevent concurrent access to segment0 by the use of locks or other means.

In operation 150G, memory controller 104 updates segment pointer0 so the first pointer element in segment0 points to (pdev12, slice0). Memory controller 104 may repeat the process two more times for each of the other two segments 1 and 2. If there are more segments, memory controller 104 may continue moving slices 120 from each segment 122 to pdev12.

Stripe Rebuild

Memory controller 104 may keep some proportion of slices 120 on each pdev 102 free for the purpose of supporting rebuilds after pdev failure. Memory controller 104 constantly monitors pdev 102 for failures to avoid allocating segment slices to failed pdevs.

Memory controller 104 may rebuild a segment 122 by selecting a new slice to replace a failed slice. Slices 120 contain multiple strips 110 and typically only one strip 110 fails at a time. This means the fault may necessarily 'inflate' to the entire slice 120. Memory controller 104 may mitigate impact of the failure at a later time by remapping bad blocks in the pdev. Once the new slice is written, all segment pointers 114 are updated to point to the new slice 120.

Figure 6:
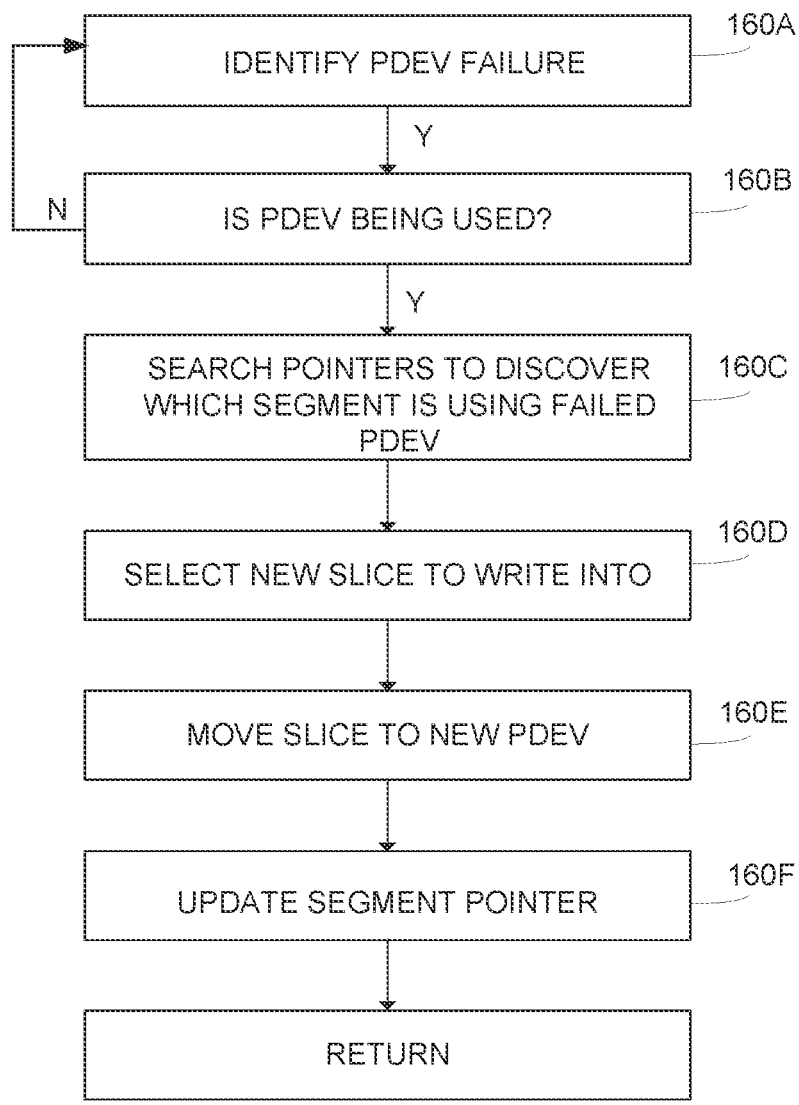
FIG. 6 shows one example of how the dynamic RAID scheme moves data from failed memory devices into other memory devices.

FIG. 6 describes a rebuild operation based on the example segments described above. In operation 160A, memory controller 104 identifies a device failure. In this example, pdev3 fails.

If the identified pdev or slice is not being used in operation 160B, memory controller 104 may ignore the failure and return to operation 160A and continue failure monitoring.

If the device or slice is being used, memory controller 104 in operation 160C searches the segment pointers to discover which segments are using the failed device (pdev3, slicen).

In the example above, memory controller 104 first identifies segment0 as using pdev3. In the example above, segments 1, 2, and 3 also use pdev3, but only slice0 has failed. Again, this is just one example, and any other algorithm may be used for identifying which segments are being used.

In operation 160D, memory controller 104 selects a new slice in a new pdev to write data from pdev3, slice0. In one example, memory controller 104 may select the pdev with the least number of used slices to rewrite pdev3, slice0. However, memory controller 104 may not select a pdev already used by segment0. In this example, memory controller 104 chooses pdev12. Memory controller 104 may prepare the identified segment for the rebuild by locking it against concurrent access.

In operation 160E, memory controller 104 moves the failed slice into new pdev12. For each 4 KB strip in the failed slice, memory controller 104 may use the segment pointer to identify and read all other strips 110 in the same stripe 112. Memory controller 104 then may use RAID6 to recalculate the content of the failed strip 110. Memory controller 104 then may write the recreated content of the 4 KB strip to the same strip in the new slice 120 in pdev12.

In operation 160F, memory controller 104 updates the pointer for segment0 to identify the new slice0 location in pdev12. Memory controller 104 returns to operation 160A and repeats until all segments 122 using failed pdev3 have been rebuilt. As mentioned above, memory controller 104 also may have to rebuild segments 1, 2, and 3.

The dynamic RAID scheme can easily expand and contract with pdev addition and removal, and can flexibly handle other RAID types with good IO performance and low metadata overhead.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The instructions can be used to cause a general-purpose computer, a special-purpose processor, such as a DSP or array processor, or the like, that is programmed with the instructions to perform the operations described. Alternatively, the operations might be performed by specific hardware components that contain hardwired logic or firmware instructions for performing the operations described, or by any combination of programmed computer components and custom hardware components, which may include analog circuits.

The methods may be provided, at least in part, as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions or data for execution by a computing machine or special-purpose hardware and that may cause the machine or special purpose hardware to perform any one of the methodologies or functions of the present invention. The term "machine-readable medium" shall accordingly be taken include, but not be limited to, solid-state memories, optical and magnetic disks, magnetic memories, optical memories, and carrier wave signals. The description of a method as being performed by a computer should not preclude the same method being performed by a person.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; flash memory; or electrical, optical, acoustical data storage medium, or the like.

Often the data is stored in the form of a logical array as the data structure. However, the same logical array may be associated with a physical memory array having the same organization. Although the operation of many of the examples herein is described as if there were a direct correspondence between the logical data structure and the physical apparatus, this may not be the arrangement in practice, where the assignment of data to memory locations may be governed by the architecture of the memory system, the possibility of bad memory locations and the like. Such assignment of the data to physical locations may be performed by a file management system, such as the PCMCIA Flash Translation Layer FTL, or file systems such as the Linux Journaling Flash File System version 2 (JFFS2), the Aleph One Yet Another Flash File System (YAFFS), or storage-aware file systems such as the Sun ZFS (Sun Microsystems), and others which would be known to a person of ordinary skill in the art.

This relation between logical and physical addresses may be presumed when interpreting the examples described herein. The choice of one or the other for discussion is a matter of convenience and is not a restriction, unless specifically mentioned. As such, data stripes of a RAID organized memory may be mapped to any of the actual memory locations in the memory system. The constraints on the timing of erase, write and read operations should therefore be interpreted with respect to the data in a stripe, wherever such stripe is located in the memory system. That is, the terms memory module, memory location, data block and the like may generally be effectively used interchangeably.

Furthermore, it is common in the art to speak of software, in one form or another (e.g., program, procedure, process, application, module, algorithm or logic), as taking an action or causing a result. Such expressions are merely a convenient way of saying that execution of the software by a computer or equivalent device causes the processor of the computer or the equivalent device to perform an action or a produce a result, as is well known by persons skilled in the art.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

A memory array may be constructed from memory elements other than disk drives. For example, the memory array may be formed by a plurality of flash memory modules or other semiconductor memory devices.

The choice of a RAID architecture is an engineering and economic decision based on such criteria as cost, reliability, latency for reading or writing, power consumption, data recovery speed, and the like. A person of skill in the art will understand that system and method shown in this example can be adapted to improve the performance of a RAIDed system in either reading data, writing data, or both.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A method implemented by a memory controller, the method comprising:
   receiving segment pointers that identify memory devices and slices for associated segments;
   identifying a most-full first one of the memory devices;
   identifying a most-empty second one of the memory devices;
   identifying one of the segments in the most-full one of the memory devices;
   moving a slice from the identified one of the segments in the most-full one of the memory devices to the most-empty one of the memory devices; and
   updating one of the segment pointers for the identified segment.

2. The method of claim 1, wherein updating one of the segment pointers for the identified segment includes the slice moved to the most-empty one of the memory devices.

3. The method of claim 1, wherein updating one of the segment pointers for the identified segment includes removing a previous segment pointer to the most-full one of the memory devices.

4. The method of claim 1, further comprising:
   determining the most-empty one of the memory devices already includes a slice for the identified segment; and
   selecting a next-most-empty one of the memory devices for moving the slice from the identified segment.

5. The method of claim 1, wherein:
   at least some of the segments include slices located in different locations in different memory devices; and
   at least some of the segments include slices located in different groups of the memory devices.

6. The method of claim 1, wherein each segment includes multiple slices of data stored as stripes across at least some different memory devices, and each of the slices includes individual strips of the data each forming part of a different one of the stripes.

7. The method of claim 6, wherein each of the slices in a same one of the segments forms different portions of a RAID group.

8. The method of claim 1, wherein the segments include contiguous stripes of data that extend across a same group of associated slices and extend down through each of the strips in the associated slices.

9. The method of claim 1, further comprising:
   receiving an offset for a segment pointer;
   identifying one of the memory devices and a slice in the segment pointer associated with the offset; and
   accessing a block of data in the identified memory device and slice associated with the offset.

10. A method implemented by a memory controller, the method comprising:
    creating segment pointers that identify memory devices and slices for associated segments;
    identifying a failure in one of the memory devices;
    searching the segment pointers to identify at least one segment that includes a slice in the failed one of the memory devices;
    selecting a new slice in one of the memory devices;
    re-creating the slice for the failed one of the memory devices from the other slices in the identified segment;
    storing the re-created slice in the new one of the memory devices; and
    updating the segment pointer for the identified segment with the re-created slice in the new one of the memory devices.

11. The method of claim 10, wherein:
    at least some of the segments include slices located in different locations in different memory devices; and
    at least some of the segments include slices located in different groups of the memory devices.

12. The method of claim 10, wherein each segment includes multiple slices of data stored as stripes across at least some different memory devices, and each of the slices includes individual strips of the data each forming part of a different one of the stripes.

13. The method of claim 12, wherein each of the slices in a same one of the segments forms different portions of a RAID group.

14. The method of claim 10, wherein the segments include contiguous stripes of data that extend across a same group of associated slices and extend down through each of the strips in the associated slices.

15. The method of claim 10, further comprising:
    receiving an offset for a segment pointer;
    identifying one of the memory devices and a slice in the segment pointer associated with the offset; and
    accessing a block of data in the identified memory device and slice associated with the offset.

16. A non-transitory storage medium (NTSM) comprising a set of instructions, wherein execution of the set of instructions by a hardware processor, is to cause the hardware processor to:
    receive segment pointers that identify memory devices and slices for associated segments;
    identify a most-full first one of the memory devices;
    identify a most-empty second one of the memory devices;
    identify one of the segments in the most-full one of the memory devices;
    move a slice from the identified one of the segments in the most-full one of the memory devices to the most-empty one of the memory devices; and
    update one of the segment pointers for the identified segment.

17. The NTSM of claim 16, wherein the updating one of the segment pointers for the identified segment includes the slice moved to the most-empty one of the memory devices.

18. The NTSM of claim 16, wherein the updating one of the segment pointers for the identified segment includes removing a previous segment pointer to the most-full one of the memory devices.

19. The NTSM of claim 16, wherein execution of the set of instructions by the hardware processor are further configured to:
- determine the most-empty one of the memory devices already includes a slice for the identified segment; and
- select a next-most-empty one of the memory devices for moving the slice from the identified segment.

20. The NTSM of claim 16, wherein:
- at least some of the segments include slices located in different locations in different memory devices; and
- at least some of the segments include slices located in different groups of the memory devices.

* * * * *